United States Patent [19]

Miller

[11] 4,239,859

[45] Dec. 16, 1980

[54] HIGH IMPACT POLYSTYRENE BLEND COMPOSITIONS

[75] Inventor: Charles R. Miller, Houston, Tex.

[73] Assignee: Shell Oil Company, Houston, Tex.

[21] Appl. No.: 70,559

[22] Filed: Aug. 29, 1979

[51] Int. Cl.³ ............................................. C08L 53/02
[52] U.S. Cl. ........................................ 525/98; 525/267
[58] Field of Search ................................. 525/98, 267

[56] References Cited

U.S. PATENT DOCUMENTS

| Re. 27,145 | 6/1971 | Jones | 525/272 |
|---|---|---|---|
| 3,231,635 | 1/1966 | Holden et al. | 525/271 |
| 3,299,174 | 1/1967 | Kuhre et al. | 525/98 |
| 3,429,951 | 2/1969 | Childers | 525/98 |
| 3,485,894 | 12/1969 | Porter | 525/193 |
| 3,810,957 | 5/1974 | Lunk | 525/98 |
| 3,907,931 | 9/1975 | Durst | 525/314 |
| 4,107,236 | 8/1978 | Naylor et al. | 525/122 |
| 4,145,376 | 3/1979 | Bracke et al. | 525/99 |

FOREIGN PATENT DOCUMENTS 1230507  5/1971  United Kingdom .................. 525/98

Primary Examiner—J. Ziegler
Attorney, Agent, or Firm—Dean F. Vance

[57] ABSTRACT

High impact polystyrene compositions are prepared by the intimate melt mixing of a styrene polymer and a particular AB two-block copolymer. The A block is a polymer of a monoalkenyl arene having a specified molecular weight range and the B block is a butadiene polymer block having a 1,2, vinyl content of greater than about 20 percent.

10 Claims, 5 Drawing Figures

IZOD IMPACT VS. STIFFNESS BALANCE

EFFECT OF VINYL CONTENT ON BLEND IMPACT STRENGTH
BLEND COMPOSITION: 25% SB/75% GPPS
APPROXIMATE SB STRUCTURE: 30 MS-100 MB

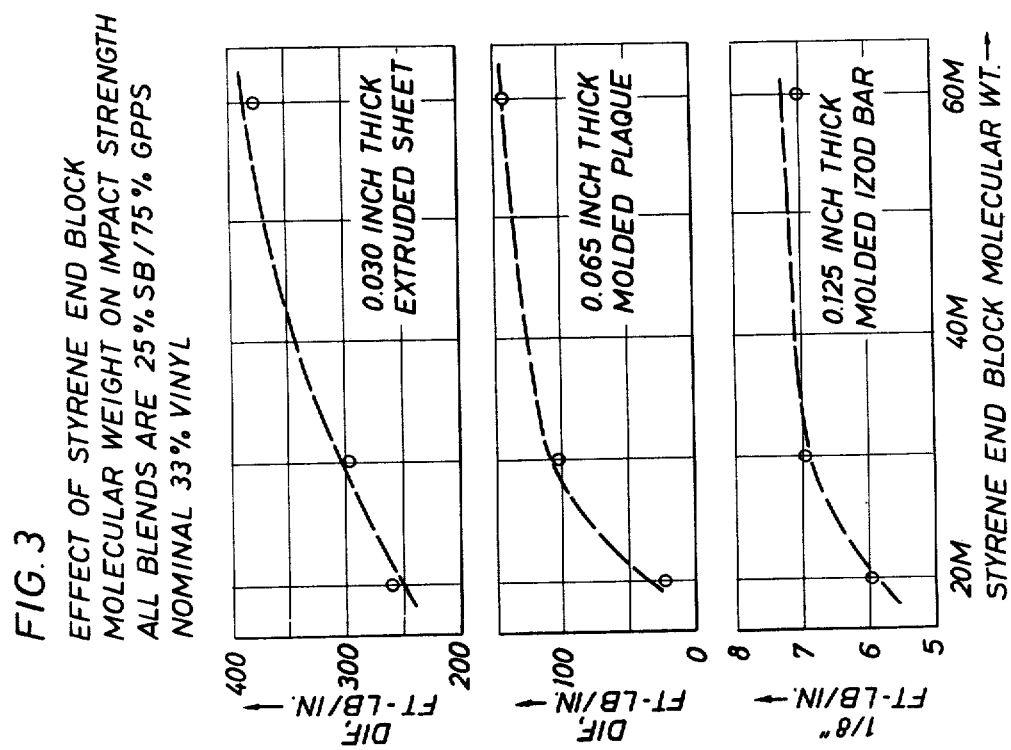
FIG. 4 EFFECT OF BLOCK POLYMER LOADING ON IMPACT STRENGTH
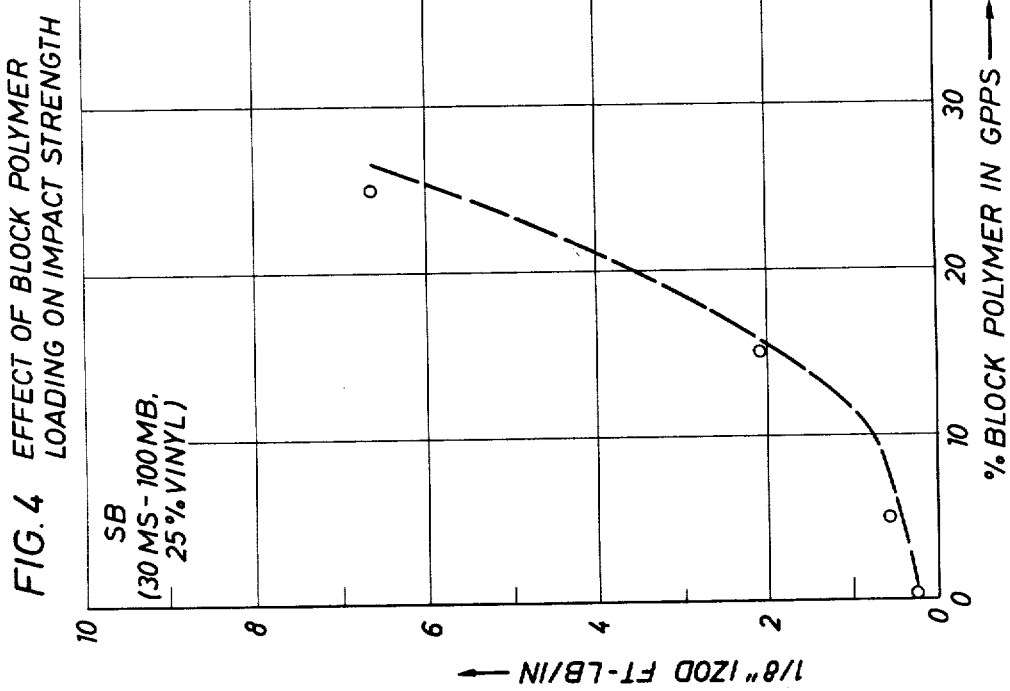
FIG. 3 EFFECT OF STYRENE END BLOCK MOLECULAR WEIGHT ON IMPACT STRENGTH
ALL BLENDS ARE 25% SB/75% GPPS
NOMINAL 33% VINYL

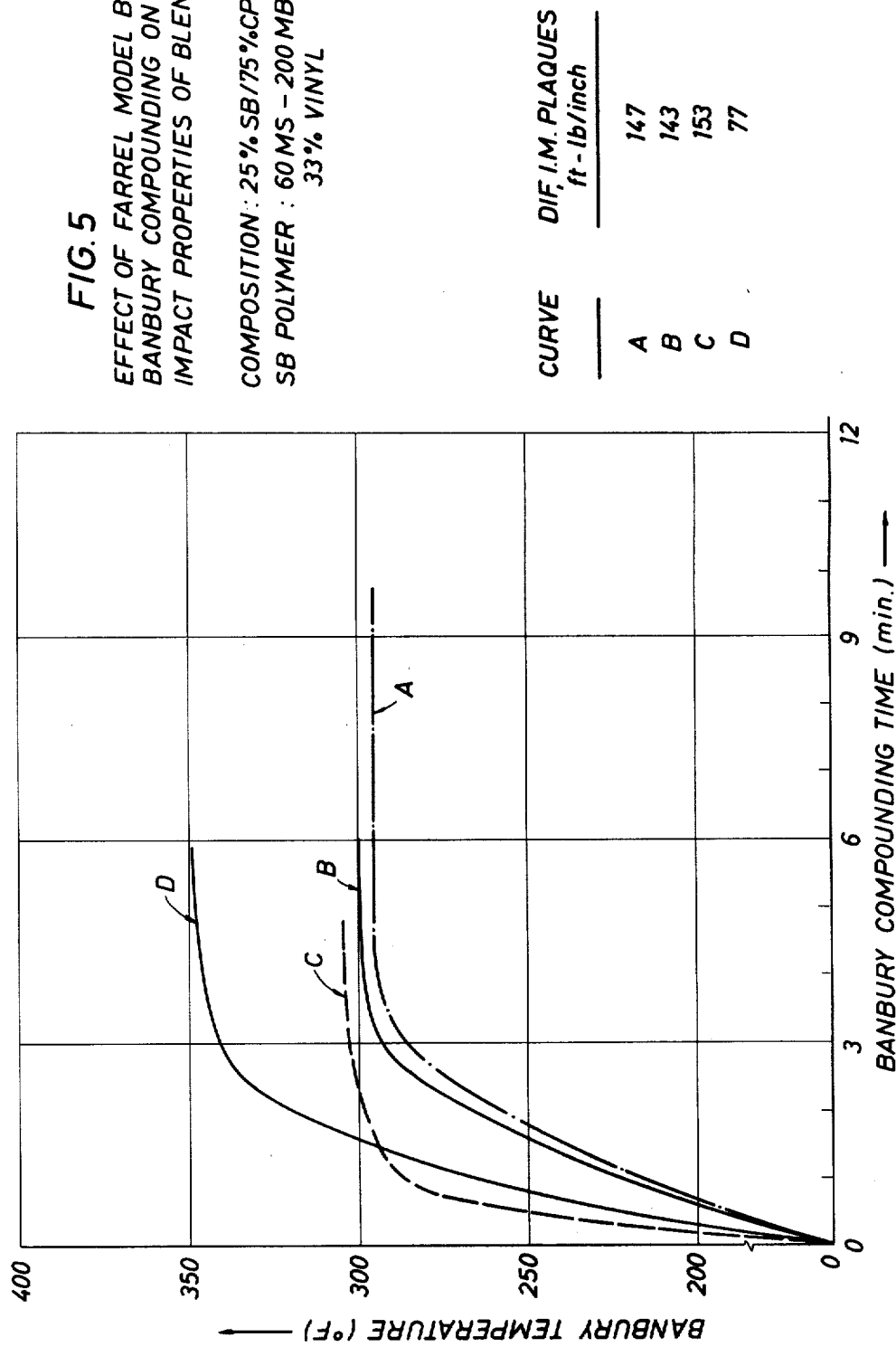

HIGH IMPACT POLYSTYRENE BLEND COMPOSITIONS

BACKGROUND OF THE INVENTION

Polystyrene is a well-known thermoplastic material finding a wide variety of uses. However, polystyrene by itself has a very low impact strength which limits its applications. There are two distinct and well-known processes to improve the impact strength of polystyrene. One process is a graft polymerization process wherein styrene monomer is grafted onto a rubbery polymer. Such a graft polymerization process is taught in U.S. Pat. No. 3,485,894 and British Pat. No. 1,230,507. An entirely different process for making high impact polystyrene involves the physical blending of a styrene polymer and a rubbery polymer.

There are a large number of patents claiming polystyrene blends having improved impact strength. U.S. Pat. No. 3,429,951 shows a blend of 75 parts by weight of polystyrene with 25 parts by weight of an AB block copolymer containing 25 weight percent of polymerized styrene and 75 weight percent of polymerized butadiene, the combination containing about 81 weight percent of total styrene. This reference teaches the necessity of a peroxide cure to achieve the desired properties; but there is a simple disclosure of such a combination which was momentarily free of peroxide in the course of preparation of a combination within the invention of the reference. However, the reference does not specify any critically for block molecular weight lengths nor for microstructure. U.S. Pat. No. 3,810,957, discloses blends of a hydrogenated styrenediene block copolymer having at least two styrene end blocks and at least one hydrogenated diene mid block. However, the Izod impact strengths obtained by the blends of the '957 patent were relatively low except at very high rubber loading. Another patent disclosing polystyrene blends is U.S. Pat. No. 3,907,931 which claims blends of a graded styrene-butadiene AB block copolymer and polystyrene. The block copolymers used in the example of the '931 reference, however, have very high molecular weights—245,000 and 280,000 and 300,000—making them very difficult to produce and to blend. As with the '951 patent, the '931 patent does not mention any critically for microstructure of the block copolymer component. Still another polystyrene blend patent is U.S. Pat. No. 4,145,376, which claims blends of polystyrene, a rubbery diene polymer and a sequenced copolymer of styrene and a diene. Very high rubber loadings appear to be required in the '376 patent to obtain good impact. It is clear that the polymer compositions cited in the above references have a number of deficiencies which limits their commercial value.

SUMMARY OF THE INVENTION

The present invention comprises a high impact polystyrene composition which has an excellent stiffness/impact balance. Further, the rubbery block copolymer component of the present invention has a relatively low molecular weight compared to the block copolymers used in other analogous systems, and is, accordingly, much easier to manufacture and to employ in the blending process. In addition, the blends of the present invention also appear to have an unexpectedly good environmental stress crack resistance. In particular, the present invention is a polymeric composition comprising a mixture of 100 parts by weight of a styrene polymer and about 15 to about 50 parts by weight of an AB block copolymer, said polymeric composition being obtained by intimately mixing said styrene polymer and said AB block copolymer at an elevated mixing temperature sufficient to provide impact improvement but below the decomposition temperature of said polymers wherein (a) said A block is a polymer block of a monoalkenyl arene having a weight average molecular weight between about 20,000 and about 150,000, (b) the weight percent of said A block in said block copolymer is between about 15 percent by weight and about 35 percent by weight; and (c) said B block is a polymer block of butadiene having a vinyl 1,2 configuration of 20 percent or greater.

There are a number of critical features in the present invention. The most critical feature is the vinyl content of the polybutadiene block. As shown in the Illustrative Embodiments and in FIG. 2, a 1,2 vinyl content of over about 20% is essential in order to obtain excellent impact strength. Preferred vinyl contents are between 20% and about 60%, more preferably above about 25%. Referring to FIG. 3, it is also important that the styrene end block of the block copolymer have a molecular weight of over about 20,000 in order to obtain the best impact properties. Preferred molecular weights are 20,000 to about 150,000, more preferably between about 30,000 and about 100,000 and most preferably between about 30,000 and about 60,000. It would appear that maximum Izod impact values occur at a 30,000 end block mol weight, but practical toughness (DIF) continues to benefit from a molecular weight higher than 30,000. In general, the molecular weight of the A block should be no higher than the molecular weight of the polystyrene in order to prevent any incompatibility problems. Further critical features are the relative amount of block copolymer and the degree of mixing. As shown in FIG. 4, the impact strength dramatically increases as the relative amount of block copolymer increases. Preferred amounts are about 15 to about 50 parts by weight block copolymer per 100 parts by weight styrene polymer, more preferably 20 to 30 parts by weight. As discussed below and as shown in FIG. 5, it is also important that the two polymers be intimately mixed at an elevated temperature. However, the mixing temperature must not be so high to result in the loss of impact properties.

Without wishing to be found to any particular theory, it is believed that the unexpected and non-obvious improvement in inpact strength for the blends of the present invention results in part from the thermal crosslinking of block copolymer to block polymer and/or to the homopolymer polystyrene matrix during mixing, said crosslinking being due to the presence of a certain number of 1,2 vinyl groups. The resulting crosslinked block copolymer acts as a very high molecular weight ABA tri-block copolymer without the disadvantage of having to manufacture and work with such a high mol weight tri-block. Of some interest, as shown in Illustrative Embodiment III, an SBS tri-block having a high vinyl content mid block did not give substantially better impact strength than a similar SBS tri-block of low vinyl content. Accordingly, there is also some significance in working with a two block SB copolymer compared to a three block SBS copolymer.

DETAILED DESCRIPTION OF THE INVENTION

Figure 1:
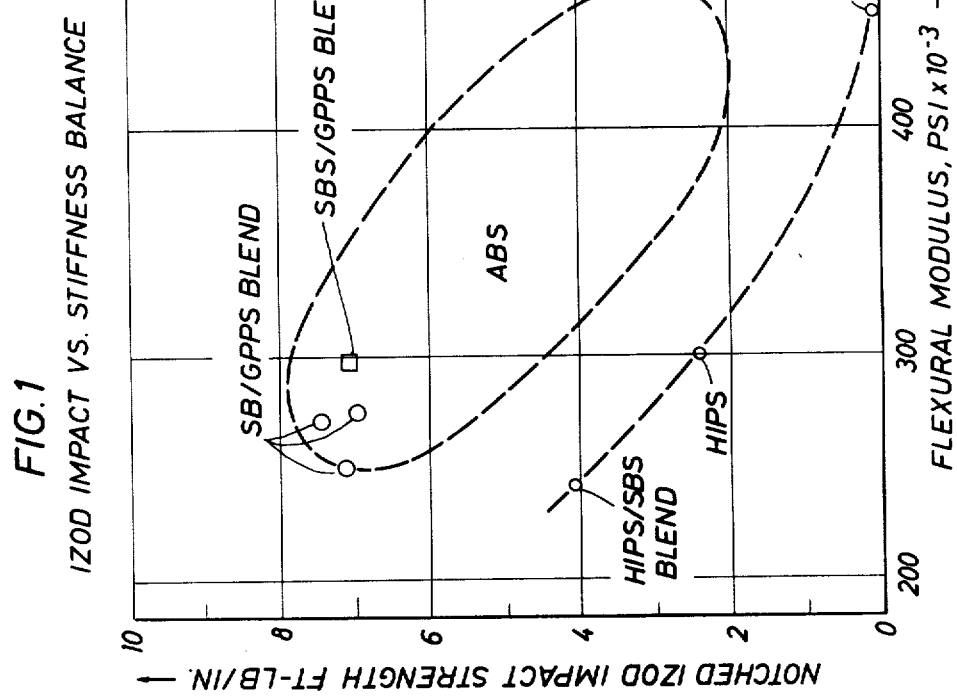

The styrene polymers employed in the blends of this invention are polymers consisting essentially of polymerized styrene, preferably styrene homopolymers. The styrene polymers can also contain up to about 10 weight percent of other copolymerized ethylenically unsaturated compounds such as other monovinyl aryl monomers like alpha-methyl styrene, acrylic compounds such as acrylic and metharcylic acid; esters, amides and nitriles on the order of methyl methacrylate, ethyl acrylate, methacrylamide, fumaronitrile and acrylonitrile; cyclic unsaturated compounds such as the nuclear chlorostyrenes, vinyl naphthalene, vinyl carbozole and acenaphthylene, and conjugated unsaturates such as butadiene, isoprene, choloroprene, 2,3,-dichlorobutadiene, piperylene and the like. In bulk polymerization these resins are commonly prepared by heating the styrene and any comonomer at temperatures in the range of 100° C. to 200° C., with application of pressure if necessary. The polymerization can also be carried out at lower temperatures by the addition of free radical generating peroxidic catalysts such as benzoyl peroxide, acetyl peroxide, di-t-butyl peroxide and the like. The polymerization can also be carried out in suspension to yield a dry powder or in emulsion, usually resulting in a latex of polystyrene, which can be either coagulated to yield the solid powdery polystyrene or used as such for blending with the other constituent in the form of a latex. The polymerization can also be carried out in solution with precipitation of the product, if desired, by standard techniques such as steam-stripping. In a preferred embodiment the polystyrene component should have a number average molecular weight of between about 50,000 and 500,000, preferably between about 75,000 and 300,000.

The other essential component in the blends of this invention is an AB block copolymer. The A block is a polymer block of a monoalkenyl arene having a weight average molecular weight between about 20,000 and about 150,000, preferably between about 30,000 and about 100,000, most preferably between about 30,000 and 60,000. The B block is a polymer block of butadiene having a 1,2 configuration of 20 percent or greater. The weight percentage of A block is between about 15 percent by weight and about 35 percent by weight, preferably between about 15 and about 25 percent. The term "monoalkenyl arene" will be taken to include especially styrene and its analogs and homologs including alpha-methylstyrene and ring-substituted styrenes, particularly ring-methylated styrene. The preferred monoalkenyl arenes are styrene and alpha-methylstyrene, and styrene is particularly preferred.

Subject to the above limitations, the A block can contain small quantities of polymerized butadiene monomer and the B block can contain small quantities of polymerized monoalkenyl arene monomers such as in a tapered or random copolymer. It is important that each of the polymer segments retain their relative non-elastomeric and elastomeric properties, but as long as these small amounts of different monomeric material do not substantially affect their relative properties, they can be employed. Generally, the non-elastomeric segment (A block) should not contain more than 25 weight percent butadiene nor should the elastomeric segment (B block) contain more than 25 weight percent monoalkenyl arene.

The AB block copolymer is typically manufactured by a process similar to the process disclosed in U.S. Pat. No. Re 27,145 and U.S. Pat. No. 4,107,236. The block copolymers of this invention are prepared by contacting the monomer with a hydrocarbon monolithium initiator. Any of the hydrocarbon monolithium initiators known in the solution polymerization arts can be employed. Typically these are represented by RLi wherein R is the hydrocarbon radical. These hydrocarbon radicals can be alipahtic, cycloaliphatic, or aromatic, containing at least one carbon atom per molecule. Those of up to 20 carbon atoms are most commonly employed, though higher molecular weight initiators can be used. Most frequently employed are the aliphatic, monolithium types. If an n-alkylithium initiator is employed, it sometimes is advisable to add a minimal amount of a polar compound, such as tetrahydrofuran, to increase initiator efficiency. The presently preferred species is sec-butyllithium for ready availability. Exemplary species include n-butyllithium, sec-butyllithium, n-decyllithium, phenyllithium, naphthyllithium, p-tolyllithium, cyclohexyllithium, eicosyllithium, and the like.

Such hydrocarbyl monolithium initiators are employed in an amount effective for polymerization of the monomer charge employed to the molecular weight desired. Typically, an exemplary amount would be such as about 0.25 to 10 mhm, millimoles per 100 grams of momomer.

Polymerization is conducted by contacting the monomer with the lithium initiator in a diluent. Diluents employed for the purpose are any of the paraffinic, cycloparaffinic, or aromatic hydrocarbons known to the art, alone or in admixture, typically those of 4 to 10 carbon atoms per molecule. Exemplary species include n-heptane, cyclohexane, n-hexane, benzene, toluene, the xylenes, 2,2,4-trimethylpentane, and the like, alone or in admixture. Cyclohexane currently is commercially preferred for ease of handling, high solubility of polymer, and availability.

Polymerization can be carried out at any convenient temperature employed in the solution polymerization arts. Suitable and exemplary temperatures lie in the range of from less than about 0° to +200° C., or more, presently preferred temperatures are about 40° to 100° C., for each step, since these temperatures are consistent with obtaining the desired polymer. The pressures employed can be as convenient, and preferably are pressures sufficient to maintain monomers and diluents substantially in the liquid phase. The polymerization times can vary widely as may be convenient, and will, of course, be affected by polymerization temperatures chosen. Times suitable should be chosen, for each step, such that substantially complete polymerization is obtained.

The medium vinyl polybutadiene block is readily obtained by employing a small amount of a polar material as a vinyl promoter. The vinyl promoter conveniently is added to the hydrocarbon diluent at the appropriate time in the polymerization sequence. These promoters can be selected from ethers, tertiary amines, and other promoters.

Exemplary species include the presently preferred tetra hydrofuran, as well as dimethoxybenzene, 1,2-dimethoxyethane, dimethyl ether, diethyl ether, methyl ethyl ether, ethyl propyl ether, di-n-propyl ether, di-n-octyl ether, anisole, dibenzyl ether, diphenyl ether, dimethylethylamine, tri-n-propylamine, tri-n-butylamine, trimethylamine, triethylamine, N,N-dimethylaniline, N-ethylpiperidine, N-methyl-N-ethylaniline, N-methylmorpholine, N,N,N',N'-tetramethylethylenediamine, and the like. The amount of polar compound employed will vary widely with the choice of vinyl promoter, but should be that amount necessary to promote the degree of vinylization desired. An exemplary amount would be in the range of about 0.1 to 25 parts by weight per hundred parts monomer.

The microstructure of the polybutadiene block of the AB block copolymer may be determined by conventional infra-red analysis, using the 910 cm$^{-1}$ band. The average molecular weights of the polystyrene blocks of the block copolymer are determined by gel permeation chromotography, whereas the polystyrene content of the polymer is measured by infra-red spectroscopy of the finished polymer.

The AB block copolymer and styrene polymer are then intimately mixed at an elevated temperature sufficient to cause impact improvement, but no so high as to cause decomposition. For example, a preferred temperature range for blending a crystal polystyrene homopolymer with a styrene-butadiene block copolymer of the present invention is between about 200° F. and 325° F., more preferably between 275° F. and 325° F. Intimate mixing means to mix the polymers with sufficient mechanical shear and thermal energy to ensure the impact improvement. An excellent mixing device is a Banbury mixer such as the Farrel Model BR 1355 cc batch size Banbury mixer. Other mixing devices include the Farrel Continuous mixer.

The polymer blends of the instant invention may be compounded further with other polymers, oils, fillers, reinforcements, antioxidants, stabilizers, fire retardants, antiblocking agents and other rubber plastic compounding ingredients without departing from the scope of this invention.

Examples of various fillers that can be employed are in the 1971–1972 Modern Plastics Encyclopedia, pages 240–247. Reinforcements are also very useful in the present polymer blends. A reinforcement may be defined simply as the material that is added to a resinous matrix to improve the strength of the polymer. Most of these reinforcing materials are inorganic or organic products of high molecular weight. Various examples include glass fibers, asbestos, boron fibers, carbon and graphite fibers, whiskers, quartz and silica fibers, ceramic fibers, metal fibers, natural organic fibers, and synthetic organic fibers. Preferred are reinforced polymer blends of the instant invention containing about 2 to about 80 percent by weight glass fibers, based on the total weight of the resulting reinforced blend. In addition, coupling agents, such as various silanes, can be employed in the preparation of the reinforced blends.

The polymer blends of the instant invention can be employed in any use typically performed by high impact polystyrene compositions such as in toys, appliances and the like.

To illustrate the instant invention, the following illustrative embodiments are given. It is to be understood, however, that the embodiments are given for the purpose of illustration only and the invention is not to be regarded as limited to any of the specific materials or conditions used in the specific embodiments.

In the illustrative embodiments, the various styrene-butadiene block copolymers were prepared by the alkyllithium initiated solution polymerization of styrene and butadiene monomers. A microstructure controlling agent was employed to vary the vinyl 1,2 structure of the butadiene portion of the block copolymer. The agents employed were dimethoxybenzene (DMB), tetrahydrofuran (THF) and diethylether (Et$_2$O). The 1,2 vinyl content was measured by infrared analysis using the 910 cm$^{-1}$ band. The styrene block molecular weight was determined by gel permeation chromotography whereas the percent weight styrene was determined by infrared analysis. The various polymers are identified below in Table I:

TABLE I

| | | Identification of Block Polymers | | | | |
|---|---|---|---|---|---|---|
| Polymer Number | Target Mol wt. S B | Styrene block Mol wt. | Total Mol wt. | 1,2 Vinyl Content | Microstructure Agent | % Styrene |
| 667A | 30M-100M | 30,100 | 151,500 | 27.8% | DMB | 22.8% |
| 667B | 30M-100M | 30,100 | 148,500 | 33.3% | DMB | 22.8% |
| 668 | 20M-66M | 21,900 | 95,400 | 32.4% | DMB | 22.7% |
| 669 | 30M-100M | 32,800 | 144,840 | 23.8% | THF | 22.6% |
| 672 | 30M-100M | 29,700 | 145,215 | 42.6% | Et$_2$O | 22.9% |
| 673 | 60M-200M | 58,200 | 306,810 | 32.7% | THF | 22.8% |
| 682 | 16M-70M-16M | 13,900 | 90,700 | 33.8% | DMB | 31.7% |

The polymers listed above are all styrene-butadiene two-block copolymers with the exception of polymer number 682 which is a styrene-butadiene-styrene three-block copolymer.

Unless otherwise specified the block copolymers were melt blended on a Farrel Model BR Banbury mixer with a standard crystal-grade general-purpose styrene homopolymer (GPPS) having a weight average molecular weight of about 280,000.

Various tests were employed to measure the performance of the polymer blends. These tests included:

| | ASTM Test Method |
|---|---|
| Notched Izod Impact strength (Izod) | D 256 |
| Dart Impact Factor (DIF) | D 3029 Modified |
| Flexural Modulus | D 790 |
| Tensile Strength at yield | D 638 |

ILLUSTRATIVE EMBODIMENT I

Figure 2:
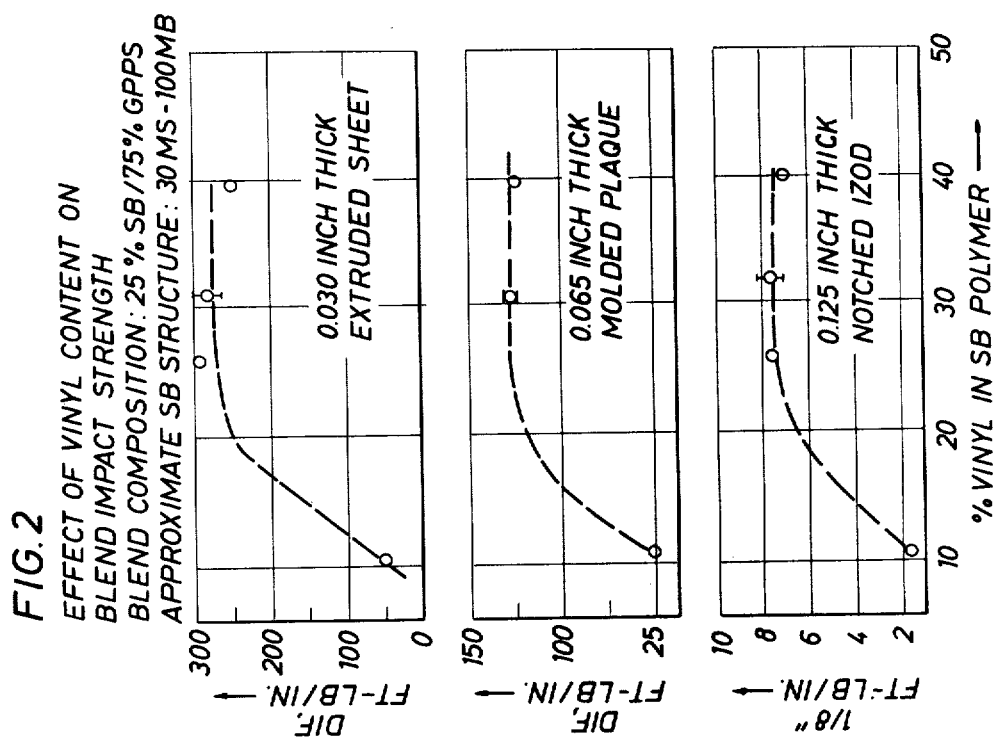

In illustrative Embodiment I the effect of varying the vinyl content of the butadiene portion of an SB two block copolymer was determined. Polymers with approximate vinyl contents of about 10%, 27.8%, 33.3% and 42.6% were prepared, all with nominal 30,000S–100,000 B structure. The results are plotted in FIG. 2. As shown in FIG. 2, as the vinyl content increases from about 10% to about 20%, the impact strength of the blend dramatically increases from an Izod value of less than 1 to a value of around 7. Likewise, dramatic increases in DIF are noted when the vinyl content is increased from 10% to over 20%.

ILLUSTRATIVE EMBODIMENT II

In Illustrative Embodiment II the effect of styrene (A) block molecular weight on impact strength of the blend was examined. For this study, a series consisting of 20MS–66MB, 30MS–100MB and 60MS–200MB block copolymers, all with a nominal 33% vinyl content, was used. The polymers employed were #668, #667B and #673. The results, plotted in FIG. 3, show that styrene block molecular weights of over about 30,000 are required for the best impact properties. The selection of the optimum styrene block molecular weight will depend, among other factors, on the molecular weight of the styrene polymer used in the blends.

ILLUSTRATIVE EMBODIMENT III

The effect of vinyl content on blends with SBS triblocks was evaluated in Illustrative Embodiment III. One of the reasons for doing this comparison was to test the diblock crosslinking mechanism theory used to explain the beneficial effect of high vinyl content on diblock polymers. Since the triblocks are already linked by the well known "styrene domain" effect, higher vinyl contents would not be expected to benefit blends of these copolymers. This was the case. The low vinyl SBS and the 40% vinyl analogue had almost identical properties, except for melt flow. The results are listed below in Table 2.

TABLE 2
Effect of Vinyl Content on SBS/GPPS Blends

| | 25% SBS/75% GPPS Blend | |
|---|---|---|
| Polymer I.D. | #700 | #682 |
| Structure | 16MS-69MB-16MS | 14MS-77MB-14MS |
| % Vinyl | 10% | 40% |
| Notched Izod, ft-lb/inch | 4.0 | 4.2 |
| Flexural Modulus, psi | 290,000 | 311,000 |
| Tensile Strength, at yield, psi | 3,400 | 3,900 |
| MF, g/10 min, Cond. G | 2.0 | 0.5 |

ILLUSTRATIVE EMBODIMENT IV

Illustrative Embodiment IV was designed to determine the effect of AB block copolymer loading on impact properties. Varying amounts of polymer #669, having a nominal molecular weight distribution of 30MS–100MB and a vinyl content of 23.8%, were mixed with a general purpose polystyrene. As shown in FIG. 4, as the amount of block copolymer is increased there is a dramatic improvement in impact properties. The minimum amount of block copolymer needed for good impact appears to be about 20 parts by weight per 100 parts by weight of the styrene polymer.

ILLUSTRATIVE EMBODIMENT V

This illustrative embodiment was designed to determine the effect of mixing conditions on blend properties. A blend of 25 weight percent of a styrene-butadiene (SB) block copolymer (#673) and 75 weight percent of a crystal grade general purpose polystyrene homopolymer (GPPS) was compounded at several time-at-temperature histories in a Farrel Model BR 1355 cc Banbury mixer. The SB copolymer was a 60,000 S-200,000B block copolymer having a 1,2 vinyl content of 33%. From these various tests it was concluded that the DIF was generally insensitive to Banbury conditions as long as the temperature was limited to below 300° F. as read off the Banbury recorder. This is shown by curves A, B and C in FIG. 5. In curves A and B, the material was brought up to 300° F. in 3 minutes by controlling rotor speed. The material was then held at that temperature: 6 minutes for curve A and 3 minutes for curve B. Curve C represents a brute force high shear compounding condition. The material was brought up to 300° F. as rapidly as possible using heat generated by the rotor and held for three minutes. The only change occurs when the material is heated above 300° F. In this case, the DIF dropped from a nominal 148 ft-lb/inch at 300° F. to 77 ft-lb/inch at 350° F.

ILLUSTRATIVE EMBODIMENT VI

This embodiment merely shows how the blends of the present invention compare in impact and stiffness with their commercial competition, including general purpose polystyrene (GPPS), interpolymerized high impact polystyrene (HIPS), blends of HIPS and SBS triblock copolymers and acrylonitrile-butadiene-styrene (ABS) terpolymers. Three blends of 25% SB diblock and GPPS are shown in FIG. 1. As seen in the Figure, these blends possess an excellent balance of properties compared to their competition.

What is claimed is:

1. A polymeric composition comprising a mixture of 100 parts by weight of a styrene polymer and about 15 to about 50 parts by weight of an AB block copolymer, said polymeric composition being obtained by intimately mixing said styrene polymer and said AB block copolymer at an elevated mixing temperature sufficient to provide impact improvement but below the decomposition temperature of said polymers wherein (a) said A block is a polymer block of a monoalkenyl arene having a weight average molecular weight between about 20,000 and about 150,000, (b) the weight percent of said A block in said block copolymer is between about 15 percent by weight and about 35 percent by weight; and (c) said B block is a polymer block of butadiene having a vinyl 1,2 configuration of 20 percent or greater.

2. A composition according to claim 1 wherein said A block is a polymer block of polystyrene.

3. A composition according to claim 1 wherein said vinyl 1,2 content is between 20 percent and 60 percent.

4. A composition according to claim 3 wherein said vinyl 1,2 content is over 25 percent.

5. A composition according to claim 1 or claim 4 wherein the molecular weight of said A block is between about 30,000 and about 100,000.

6. A composition according to claim 5 wherein the molecular weight of said A block is between about 30,000 and about 60,000.

7. A composition according to claim 1 or claim 4 wherein the amount of said AB block copolymer is between about 20 and about 30 parts by weight.

8. A composition according to claim 1 wherein said mixing is performed with a Banbury mixer.

9. A composition according to claim 8 wherein said mixing temperature as shown on the Banbury temperature recorder is between about 200° F. and about 325° F.

10. A composition according to claim 9 wherein the mixing temperature of said polystyrene and said block copolymer is such as to not adversely affect properties by degradation or excessive cross-linking of the block copolymer.

* * * * *